A. M. RICKS.
BEET HARVESTER AND TOPPER.
APPLICATION FILED AUG. 28, 1916.
1,282,462.
Patented Oct. 22, 1918.
2 SHEETS—SHEET 2.
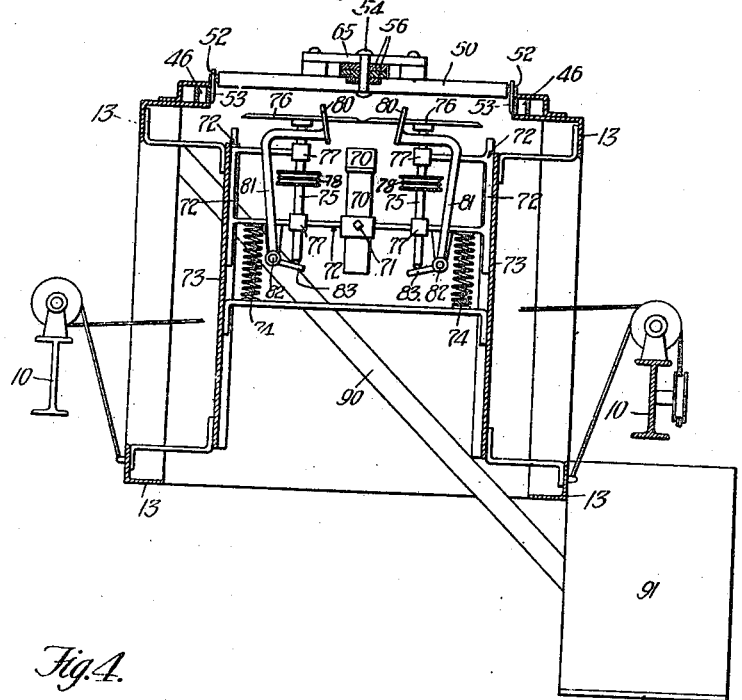
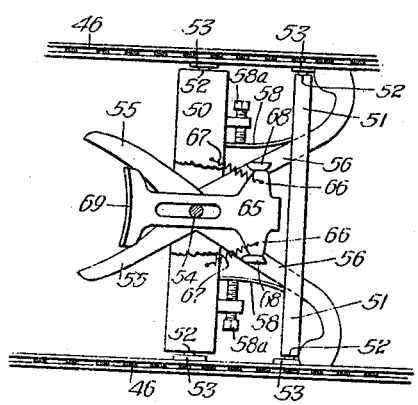
Inventor
Alva M. Ricks
by Jms T Batchelor
his Attorney.

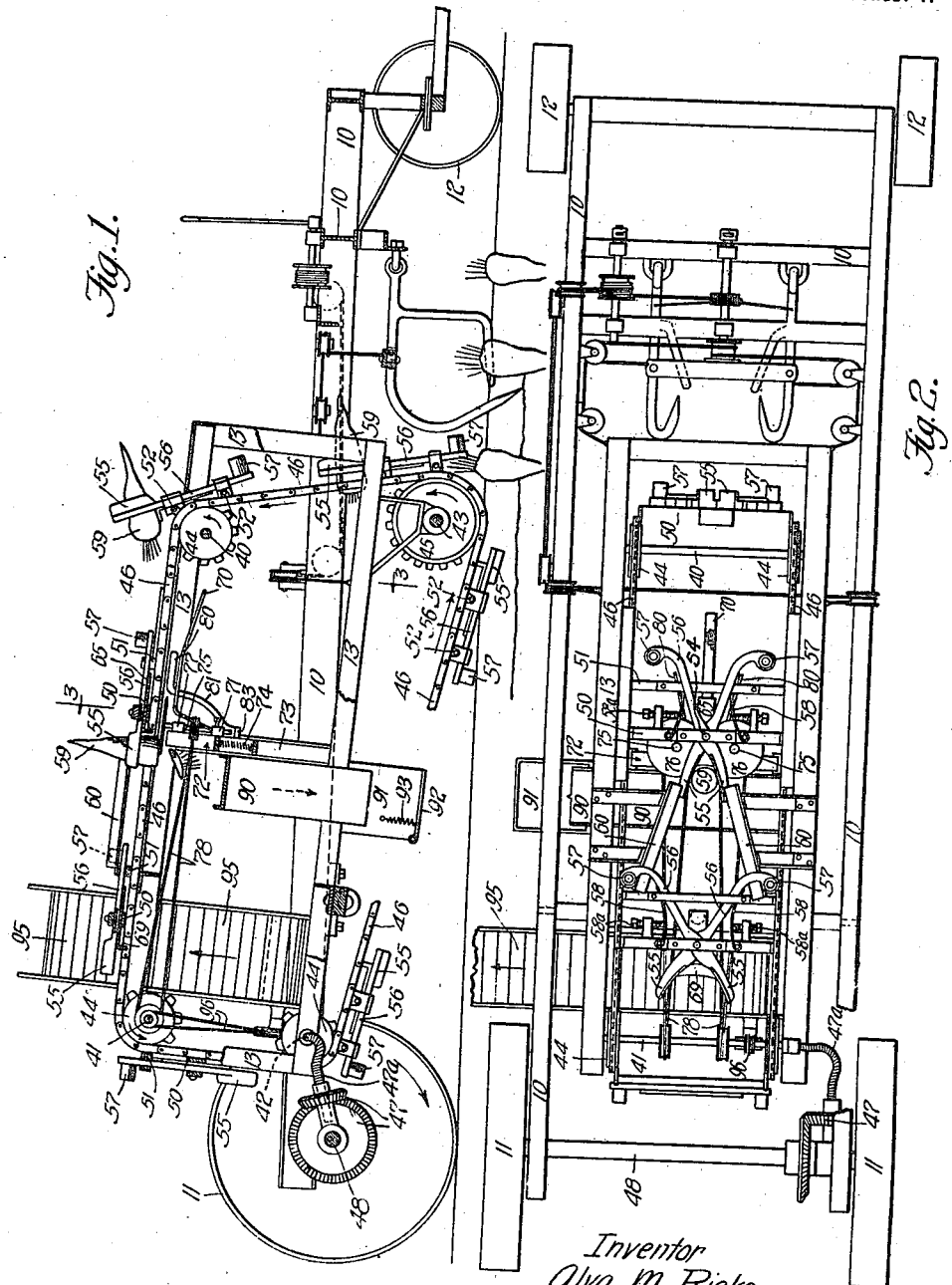

UNITED STATES PATENT OFFICE.

ALVA M. RICKS, OF LOS ANGELES, CALIFORNIA, ASSIGNOR OF FORTY-NINE ONE-HUNDREDTHS TO IDA WESSEL, OF IMPERIAL, CALIFORNIA.

BEET HARVESTER AND TOPPER.

1,282,462.

Specification of Letters Patent.   Patented Oct. 22, 1918.

Application filed August 28, 1916.   Serial No. 117,182.

*To all whom it may concern:*

Be it known that I, ALVA M. RICKS, a citizen of the United States, residing at Los Angeles, in the county of Los Angeles, State of California, have invented new and useful Improvements in Beet Harvesters and Toppers, of which the following is a specification.

This invention relates to mechanisms for harvesting and topping beets, or the like; and it is a primary object of this invention to provide an efficient machine which will effectively gather the beets and accurately top them. There are other objects of my invention which will appear from the following specification:

In accomplishing the objects of my invention, I provide a machine in which a salient feature is provision for first harvesting or gathering the beets from the ground and then topping them while they are held in the mechanism. By making this provision I am enabled to hold the beet firmly so that it may be topped efficiently; and I am further enabled to have certain adjustments, manual and automatic, by which beets of different sizes, held in different positions in the mechanism, may all be uniformly topped. It has heretofore been a deficiency in beet toppers that the beets have not been uniformly topped; and it is one of the objects of my invention to overcome this deficiency and provide a machine which will not only fully gather the beets, but will accurately and uniformly top them. It is also an object to provide a mechanism which will not mutilate the beets; and this object is furthered by having the beets topped while held in the mechanism rather than topped while in the ground.

In a preferred form of device I employ traveling beet grippers which are caused to travel forwardly at a proper point to automatically grip the beets as the machine advances along the row of beets. These beet grippers grip the beets firmly and then travel upwardly and then rearwardly in the machine, so that the beet grippers are inverted during their rearward movement. During a part of this rearward movement, the head of the beet (which is then lowermost) come into engagement with an adjusting member which causes the topping mechanism to be automatically adjusted in position with reference to the position of the beet (that is, with reference to the vertical distance between the top of the beet and the point where it is gripped). At the same time, the head of the beet engages the device which causes adjustment of the topping cutters to compensate for the size of the beet. A beet of larger diameter is thus caused to be cut further from its top than a beet of smaller diameter. When the top is severed from the beet it falls into a discharge chute, as it may readily do because the beet is inverted. Further along in the movement of the gripper the hold on the beet is released and the beet then drops onto an elevator which carriers it out from the machine.

A preferred form of device, embodying my invention, is explained in the following specification, reference being had to the accompanying drawings in which Figure 1 is a central longitudinal vertical section of my improved mechanism, parts being shown in elevation for clarity of illustration; Fig. 2 is a plan of the same; Fig. 3 is an enlarged section taken as indicated by line 3—3 on Fig. 1; Fig. 4 is a bottom view of one of the beet grippers.

In the drawings I show a suitable frame 10 supported upon wheels 11 and 12. The machine may be propelled over the ground in any suitable manner. For the sake of simplicity I have illustrated my machine in form to be drawn by horses. Within the main frame 10 I mount a sub-frame 13.

I now proceed to a description of the gathering and topping mechanism mounted upon the sub-frame 13. The sub-frame has four transverse shafts 40, 41, 42 and 43, carrying sprocket wheels 44 and 45 as shown. A pair of endless chains 46 is arranged on these sprocket wheels. The shaft 42 is driven by any suitable connection, as illustrated at 47 and 47ª, from shaft 48 of the wheels 11; the ratio of this connection being arranged so as to cause the chains 46 to travel at the proper speed. The shafts rotate in the directions indicated, causing the chains to travel forwardly beneath the frame 13 and rearwardly on top of the frame 13.

The gripping mechanisms are mounted at intervals on and between the chains 46. For each gripping mechanism there is a pair of cross bars 50 and 51 pivotally mounted at their ends at 52 in lugs 53, which are mounted upon the links of the chain. On each of the cross bars 50 I provide a central pivot 54 for the jaws of the grippers. These jaws 55 are mounted upon arms 56 which extend rearwardly from the pivot 54 and carry rollers 57, as illustrated. Springs 58 tend to normally close the gripper jaws upon a beet, holding the beet, as is illustrated at 59; the pressure of springs 58 being adjustable at 58ª. As the grippers pass rearwardly over the upper part of frame 13, the rollers 57 engage guides 60, which guides diverge rearwardly in such a manner that as the grippers move rearwardly the rollers 57 and arms 56 are forced apart, causing the jaws 55 to be forced apart. When the jaws reach their expanded position shown in Figs. 2 and 4, they are then held in this position by a device best illustrated in Fig. 4. Beneath the jaws there is a slider 65 having lugs 66 moved forward by springs 67 to move between lugs 68 on the under side of arms 56, to thus hold the arms apart. The forward end of slider 65 has a head 69 which projects out into the space between and under the jaws 55 in the manner shown in Fig. 4. The grippers are in this expanded or set position as they move forward on the under side of the machine. When they move forwardly the head 69 moves forward against a beet and is caused to move relatively rearwardly by engagement with the beet. This causes the lugs 66 to move rearwardly away from the lugs 68, allowing the arms 56 and jaws 55 to contract under the action of springs 58; causing the jaws 55 to grip the beet with a force dependent upon the tension of springs 58. This tension may be so adjusted by the adjusting means at 58ª as to cause the beet to be gripped firmly enough so that it may be lifted out of the soil, which may have been previously loosened by plows. The gripper, with its gripped beet, then travels upwardly at the forward end of frame 13 and then turns over and travels rearwardly on the top of the frame. As the beet moves rearwardly, held by the gripper, its inverted top comes into engagement with a guide bar 70. This guide bar 70 is adjustably mounted, at 71, upon a vertically movable frame 72 mounted in vertical ways 73 on the frame 13. Springs 74 tend to move this frame 72 up to its upper position, which is shown in Fig. 3. Frame 72 carries two vertical shafts 75, carrying a pair of disk cutters 76. These shafts and cutters are also vertically adjustable with respect to the sliding frame 72, the shafts 75 being revoluble and slidable in their bearings 77. These shafts 75 and cutters 76 are driven from the shaft 41 through the medium of driving connections 78 of any suitable kind. Now, when the beet moves rearwardly, its inverted head strikes the member 70 and causes the frame 72 and the cutter 76 to be moved downwardly by a distance dependent upon the distance the head of the beet projects below the gripper jaws 55. Consequently, the cutters 76 are moved by this means to a certain definite position with reference to the top of the beet; and this certain definite relation may be manually adjusted by adjusting the position of member 70 on frame 72. The adjustment of member 70 will be governed by the average size of the beets being topped, or by the average of the smallest of the beets. Means are provided for automatically adjusting the position of the cutters 76 for the larger beets. I provide a pair of inclined spreaders 80 which converge forwardly and between which the head of the beet is adapted to enter during its rearward travel. These spreaders 80 are mounted upon arms 81 pivoted at 82; and the arms have feet 83 which support the shafts 75. When a beet of larger size enters between spreaders 80, the action is to raise the shafts 75 and cutters 76 by an amount dependent upon the size of the beet. Thus the cutters are lowered in accordance with the position of the beet in the gripper and the cutters are raised in accordance with the size of the beet, cutting the same amount from beets of the same size and cutting more from the top of a large beet than from the top of a small beet.

The tops, as they are severed from the beets, drop onto a chute 90 and run into a box 91. This box 91 has a hinged bottom 92 supported by a suitable spring 93. When the weight of the tops in the box is sufficient to overcome the tension of the spring, the tops are then discharged by the bottom of the box dropping; the tops being deposited in piles along the ground. As hereinbefore explained, each of the grippers is set when the rollers 57 engages the guides 60. When this occurs the jaws 55 are spread apart and the topped beet is allowed to drop onto an elevator 95. This elevator 95 is driven by any suitable driving connection, as shown at 96, from shaft 41. The elevator conveys the topped beets out to the side of the machine to drop them into a wagon or cart alongside.

The fact that I do not attempt to top the beets while standing in the ground enables me to largely do away with mutilation of the beets. The beet is firmly held by the gripper; so that it may be cleanly topped when the topping mechanism is reached. Topping the beet when out of the ground has many advantages, and a primary advantage is that the beet may be cleanly topped and that adjustment may be made as to the amount of cut without any interference, such as usually is the case where it is attempted to top the beets in the soil. Inverting the beet before topping is also an advantageous feature, and the means for adjusting the cutter both with relation to the position of the beet and the size of the beet cause each beet to be properly topped by just the right amount.

Having described a preferred form of my invention, I claim:

1. In a device of the character described, a beet gripping device embodying a pair of pivoted jaws adapted to receive a beet between them, spring means for normally closing said jaws, and means for holding said jaws open embodying a member projecting into the space between the jaws to be engaged and moved by a beet.

2. In a device of the character described, a beet gripping device embodying a pair of pivoted jaws adapted to receive a beet between them, spring means for normally closing said jaws, means for holding said jaws open embodying a member projecting into the space between the jaws to be engaged and moved by a beet, means for carrying the beet gripping device against a beet in the soil; and means against which the device is carried to spread the gripping jaws apart.

3. In a device of the character described, a beet gripping device, spring means for closing said device, releasable means for holding said device open, said releasable means adapted to be engaged and operated by a beet, means for carrying the beet gripping device against a beet in the soil; and means for opening said device to release a beet.

4. In a device of the character described, an endless carrier, a plurality of beet gripping devices mounted thereon each comprising a pair of oppositely disposed gripping members and means adapted to normally draw said members toward each other to grip a beet, catch means for holding said members apart, said catch means being releasable by engagement with a beet when the gripping device is advanced upon a beet in the soil, and means into engagement with which the gripping devices are carried by the carrier to spread said gripping members apart to release the gripped beet.

5. In a device of the character described, the combination of a movable beet carrier, a beet topping mechanism embodying a frame movable to and from the carrier, cutting means adjustably mounted on the frame, means actuated by contact with the end of a beet in the carrier to move the frame, and means actuated by contact with the sides of a beet in the carrier to adjust the cutters on the frame.

6. In a device of the character described, the combination of a moving beet carrier, a beet topping mechanism embodying a frame movable to and from the carrier, cutting means adjustably mounted on the frame, means actuated by virtue of the position of the beet in the carrier to move the cutter frame, and means actuated by virtue of the size of the beet in the carrier to adjust the position of the cutter on the frame.

7. In a device of the character described, the combination of a moving beet carrier, a beet topping mechanism embodying a frame movable to and from the carrier, cutting means adjustably mounted on the frame, means actuated by virtue of the position of the beet in the carrier to move the cutter frame, said means embodying a guide bar secured to the frame and situated in the path of beets carried by the carrier so that the tops of said beets will strike the guide bar, and means actuated by virtue of the size of the beet in the carrier to adjust the position of the cutters on the frame, said means embodying yielding spreader bars between which the beets pass, said spreader bars being connected to the cutters so that movement thereof causes adjustment of the cutters on the frame.

In witness that I claim the foregoing I have hereunto subscribed my name this 18th day of August, 1916.

ALVA M. RICKS.

Witness:
ELWOOD H. BARKELEW.